Aug. 11, 1959    C. J. PETERSON ET AL    2,899,066
ROTARY VACUUM FILTER

Filed Oct. 27, 1955    3 Sheets-Sheet 1

INVENTORS
C. Lynn Peterson
Clarence J. Peterson
Robert J. Mattison, Jr.
BY
ATTORNEYS INVENTORS
C. Lynn Peterson
Clarence J. Peterson
Robert J. Mattison, Jr.

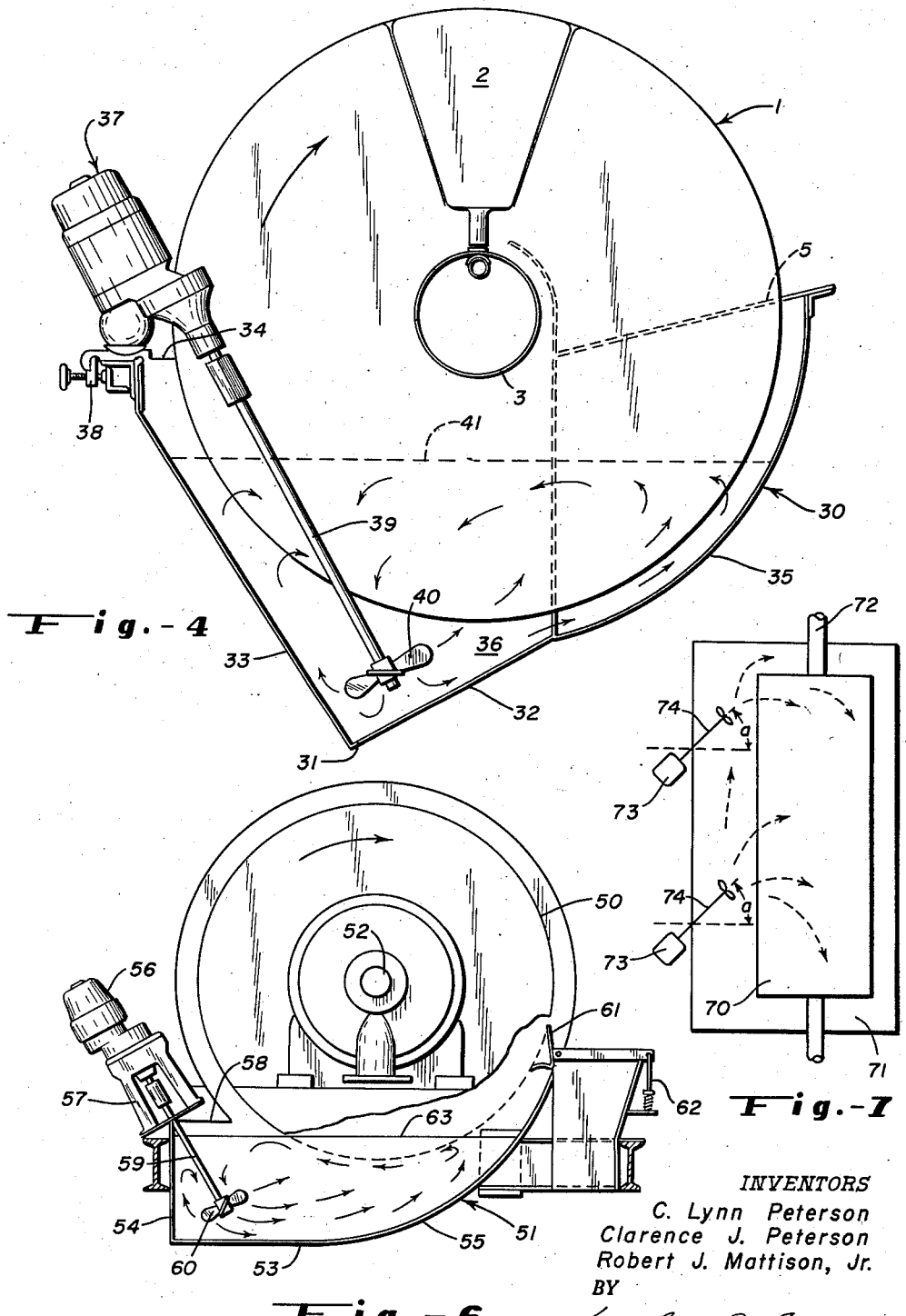

United States Patent Office 2,899,066
Patented Aug. 11, 1959

2,899,066

ROTARY VACUUM FILTER

Clarence J. Peterson, C. Lynn Peterson, and Robert J. Mattison, Jr., Salt Lake City, Utah, assignors to Peterson Filters and Engineering Company, Salt Lake City, Utah, a corporation Application October 27, 1955, Serial No. 543,072

1 Claim. (Cl. 210—383)

This invention relates to rotary vacuum filtration equipment and methods of filtering free settling solids from a slurry of such solids.

Metallurgical pulps or slurries may contain a variety of solid particles of different sizes, ranging from coarse, rapidly settling particles to extremely fine or slime sizes which are slow settling in liquid. In recovering such solids from the liquid, vacuum filtration provides a fast and efficient method. In the filtration, however, the coarse or free settling particles have a tendency to settle away from the filter elements, and very quickly the coarse particles settle and stratify at a distance below the surface of the slurry. As a rotary filter element surface first enters a slurry it has its greatest filtering potential since the surface is clean and the pressure differential permits a large volume of liquid to pass through the relatively clean surface. However, where the free settling particles have settled below the filter element, the slime sizes contact the filter media forming a thin, dense cake substantially clogging the pores so that the filtering rate decreases rapidly as the filter medium passes through its arcuate course in the slurry. Since the slower filtering slime sizes are deposited first as a cake on the filter medium, the filtration rate is substantially less than where a homogeneous cake of all particles can be formed on the filter media.

There have been many attempts in the art to prevent this settling of the coarser particles, or as it is sometimes known as classification; however, the attempts have had only poor or moderate success and are generally expensive devices. Among the various devices which have been utilized to prevent the settling of the slurry in the filter tank have been horizontal paddle type agitators which have glands that are extremely difficult to maintain, and rocker agitators which are costly to build and structurally limit the length of the filter element. In another attempt to prevent the settling of the slurry, an agitator in a tubular housing was provided at substantially the same level as the filter element and at a distance from the filter medium. In all these prior art methods the slurry tank of the filter is substantially larger than the volume of the filter unit submerged therein so that an unduly large quantity of slurry is required in the tank. Also, the large tanks place a substantial volume of slurry at a considerable distance from the filter element, increasing rather than decreasing the problem.

According to the present invention there is provided novel rotary filtration equipment which utilizes a relatively small tank and an effective agitating system which thoroughly mixes the slurry throughout the tank so that all the slurry in contact with the filter medium is homogeneous. The invention provides means for depositing a homogeneous cake of all particle sizes on the filter medium, so that there is a uniform cake and hence efficient filtration. The device of the invention provides an impeller which is in close proximity to the filter surfaces, and which lies entirely beneath the vertical extent of the filter elements whereby a relatively small slurry tank may be utilized for the filtration apparatus, wherein only a relatively small quantity of slurry is required in the filtration slurry tank.

In a preferred form, a pocket-like bottom is provided in the slurry tank with sides extending generally upwardly therefrom, and an agitator of the unit is mounted in the small pocket whereby circulation of the slurry in the tank is from the pocket generally upwardly along the tank bottom. The agitating and mixing unit is preferably a propeller type impeller, which is mounted in close proximity to the filter surfaces and is arranged so that its suction side is from the top downwardly and the discharge of the propeller is along the bottom of the tank. By having an open impeller mixing and agitation of the entire body of slurry in the tank is accomplished and circulation of the pulp to all surfaces of the filter elements is provided.

Included among the objects and advantages of the present invention is to provide an efficient filter apparatus for free settling slurries, which apparatus produces a homogeneous cake providing optimum filtration and displacement wash. An efficient agitating and mixing unit is provided which is mounted in close proximity to the lowermost surfaces of a filter element, thereby permitting the use of a relatively small slurry tank containing a relatively small amount of filterable slurry. The impeller of the agitating and mixing unit is so directed as to thoroughly mix all portions of the slurry in the tank so as to provide a homogeneous slurry of all particle sizes throughout the volume of the slurry. The shaft of the agitating unit is mounted in upright position and is suspended from a point above the slurry so that there are no bearings or glands required which touch or operate in the slurry of the tank, and which still provides an efficient agitating and mixing unit.

These and other objects and advantages will be readily apparent by referring to the following description and illustrations in which:

Fig. 4 is a side elevation of a modified agitator arrangement according to the invention for a disc type filter;

Fig. 6 is a side elevation of an agitator unit mounted on a drum type vacuum filter; and Fig. 7 is a top plan view of a filter including agitators with adjustable angle impeller shafts.

Figure 1:
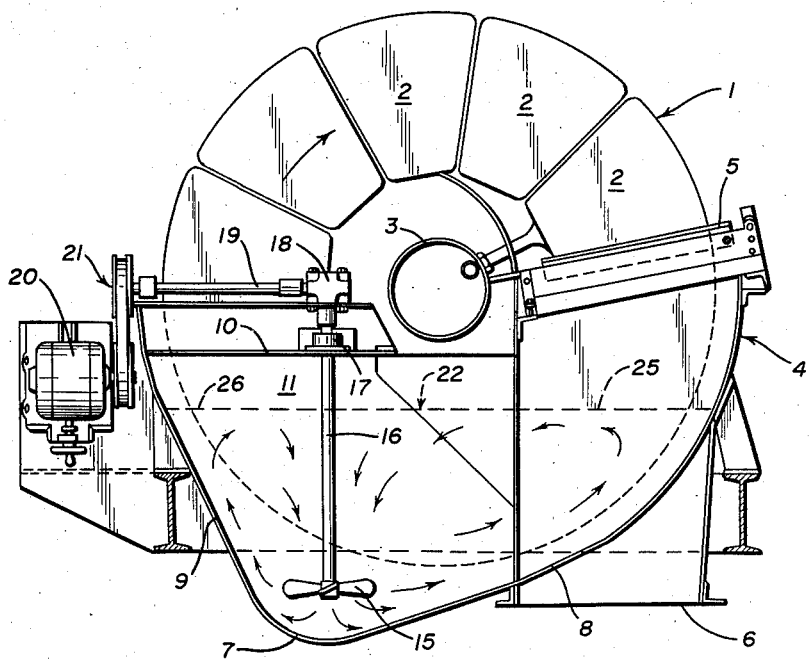
Fig. 1 is a side elevation of a disc type filter showing the novel agitating means according to the invention.
Figure 2:
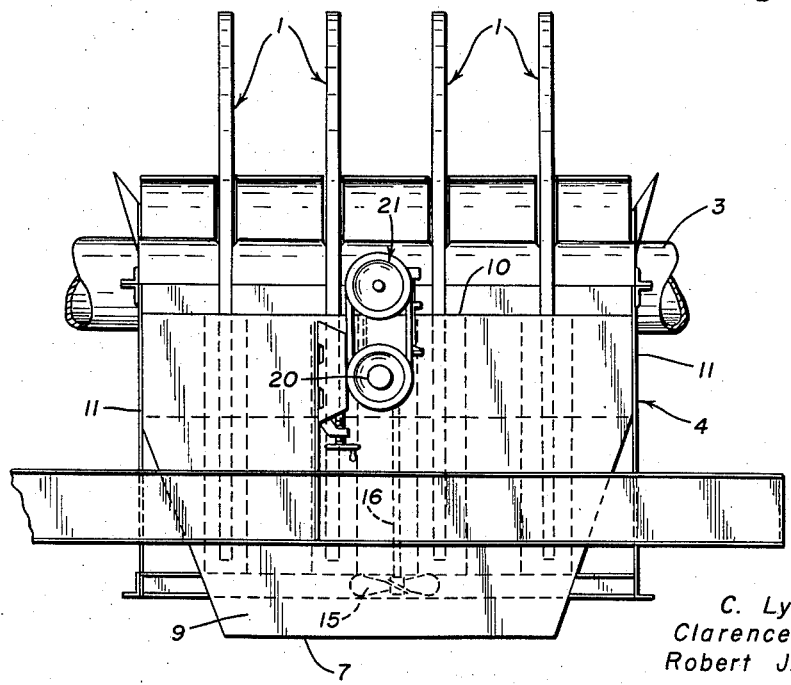
Fig. 2 is a front elevation of the filter unit of Fig. 1.
Figure 3:
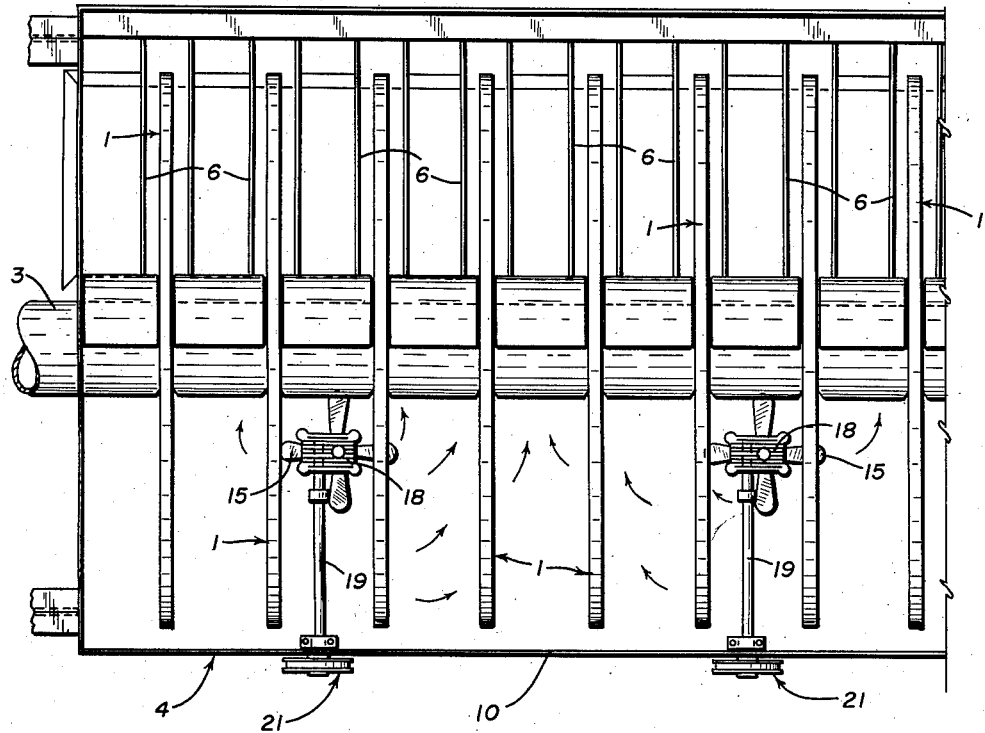
Fig. 3 is a top plan view of a filter unit showing a multiple mounting of agitators along an elongated filter unit.

In the device illustrated in Fig. 1, a disc type filter is provided with a shallow tank and an agitator in position to thoroughly mix and circulate the slurry throughout the tank. The discs, indicated in general by numeral 1, comprise a plurality of sectors 2 mounted on and arranged around a substantially horizontal shaft 3 for rotation (partially shown for clarity) in a slurry tank shown in general by numeral 4. The filter unit may be a typical disc filter having a scraper 5 and a cake discharge chute 6. The device of Figs. 1 and 2 shows a four-leaf filter, and the top plan view of Fig. 3 illustrates a similar filter having more than four leaves. Whether the filter has one or more leaves is not a controlling factor since the operation of the mixing system is substantially the same. In the top plan view of Fig. 3 the discharge chute 6 is shown as extending outwardly on one side of the tank between pairs of discs 1. A scraper blade, not shown in Fig. 3 for clarity, extends along each side of each disc, in the position illustrated in Fig. 1, so that cake may be scraped from each side of the filter and the cake therefrom will be discharged through the discharge chutes 6. The discs rotates clockwise, as indicated in Fig. 1, so that the cake which forms in the tank is dried or substantially dehydrated before it contacts the scraper 5.

The tank 4 comprises a bottom 7 which extends along the length of the filter discs and includes an upwardly extending portion 8 to one side and an upwardly extending portion 9 to the other side terminating in an upper wall 10. The ends of the tank 11 complete the slurry holding tank which conforms in general to the outline of the filter elements. The bottom 7 provides a shallow pocket beneath the filter elements and in a position below the vertical extent of the filter discs. A propeller type impeller 15 is mounted on a substantially vertical shaft 16 which is journaled for rotation in a bearing 17 mounted on the top of the tank 10 above the slurry. A cone drive 18 is interconnected with a horizontal drive shaft 19 for turning the impeller. A motor 20 and a variable speed drive, indicated in general by numeral 21 is used for rotating the shaft 19. The bearing 17 is substantially above the normal liquid level indicated by the dashed line 22 in the tank 4. As indicated in Fig. 3, the shaft 19 extends between the filter elements 1 so that the impeller 15 lies underneath the filter units. The tank 4 is only slightly larger than the peripheral outline of the filter elements so that a relatively small amount of filterable slurry is maintained in the tank 4.

As indicated above, there is substantially no limit as to the size of filter which may be utilized with the device of the present invention, and the agitating units may be placed as close together as is economically feasible or as may be required for the complete mixing and movement of the slurry. With such small tanks having a relatively small amount of slurry it is unlikely that the impellers will become immovably embedded in settled solids of the slurry, as where the unit has been inactive for a period of time to permit the slurry to settle. However, the individual agitators may be jogged and quickly freed in the event that they have become embedded in settled solids. Also, since the impellers are open in the tank below the filter elements the agitation extends completely along the tank as shown by the arrows in Fig. 3 so as to stir up all the solids so settled.

The agitator of Fig. 1 is a downdraft agitator, and as the impeller rotates there is a substantial suction extending downwardly along the shaft 16 into the impeller. The circulating liquid moving downwardly from the impeller strikes the bottom 7 and passes up along the walls 8 and 9 toward the filter element.

The agitator prevents any settling of any solids along the bottom wall and the circulation provides a substantially homogeneous slurry throughout the tank. The point 25 indicates the position of the scraped filter elements as they enter the slurry in the tank, and point 26 indicates the emergence of the filter elements from the slurry loaded with cake from the slurry.

Figure 5:
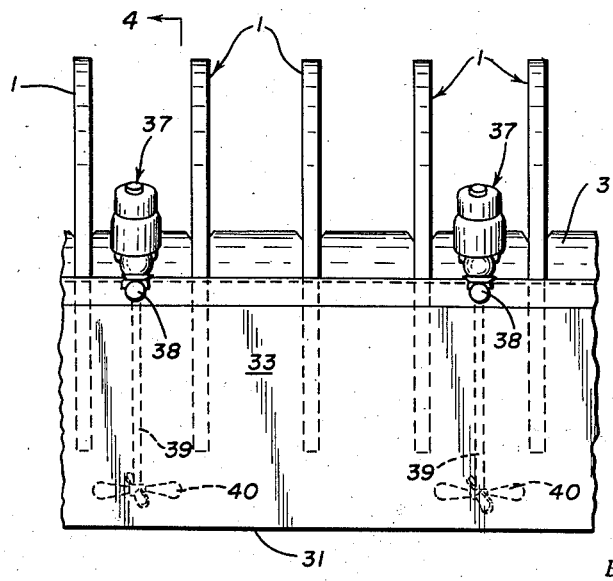
Fig. 5 is a side elevation of the agitator unit of Fig 4.

In the device illustrated in Figs. 4 and 5, a disc 1 having a plurality of sectors 2 (only one is shown for clarity) spaced around a horizontal shaft 3 for concurrent rotation therewith is mounted in a tank shown in general by numeral 30. The tank 30 comprises a bottom or pocket 31 with an upwardly extending wall 32 extending in one direction and an upwardly extending wall 33 extending in the opposite direction toward a top 34 of the tank. The walls 32 and 33 are substantially straight, and the wall 32 is interconnected with a curved bottom portion 35 of the tank 30. End walls 36 complete the tank for holding slurry. A portable mixer, shown in general by numeral 37, is mounted by means of a clamp mount 38 on the edge 34 of the tank. An elongated shaft 39 rotatably secured to the mixer passes between adjacent leaves of the agitator down into the bottom 31. A propeller type agitator 40 is mounted on the shaft 39 in the pocket or well 31. The normal level of slurry in the tank is indicated by dashed line 41 and motor and gear box of the mixer is maintained thereabove. As indicated in Fig. 5, a plurality of mixers may be utilized for such a filter, the number of mixers depending on the number of discs and the distance between the mixers in the filter tank. Since the tank and the filter shaft may be substantially any length, Fig. 5 merely illustrates the position of two adjacent mixers in relation to the discs.

The circulation of the slurry under the influence of the impeller 40 is similar to circulation described for the agitator of Fig. 1, and in the case of the device of Fig. 4, the slurry is completely mixed and circulated to maintain a homogeneous slurry in contact with the filter medium. This produces a cake which is homogeneous with all solids in the cake in the same proportion as in the slurry.

Since the bottom 31 is in close proximity to the filter elements 1 and the tank conforms generally to the peripheral outline of the filter elements, only a small amount of slurry is utilized at any one time for the filtering operation. The complete mixing and the circulation keeps a homogeneous slurry throughout the tank. Since the slurry is homogeneous along the filtration path, the coarse and fine material will be deposited in the cake on the filter medium in substantially the same ratio as they occur in the slurry surrounding the filter element.

In the device illustrated in Fig. 6, a drum type filter 50 is mounted in a tank, shown in general by the numeral 51, and the drum is journaled for rotation on a horizontal shaft 52. The tank 51 comprises a bottom or pocket portion 53 which has an upstanding wall 54 extending from one side thereof and an arcuate wall 55 extending upwardly from the other side thereof. A motor and gear arrangement 56 is mounted on a stand 57 which is secured to the top wall 58 of the tank. A shaft 59 interconnected with the motor is arranged for rotation therewith and extends into the pocket 53. A propeller type impeller 60 is mounted on the shaft 59 and is arranged for agitating and mixing the slurry in the tank 51. The drum 50 rotates clockwise, as indicated by the arrow, and a knife scraper 61 which is held in position on the drum periphery by means of a spring loaded lever arm 62 for scraping the cake from the periphery of the drum. The level of the slurry 63 in the tank provides about twenty percent submergence of the drum in the slurry.

The rotation of the agitator 60 in the tank 51 provides a flow of slurry along the bottom 55 and along the periphery of the drum 50 back to the vortex along the shaft 59 into the impeller 60 again. Due to the angle at which the impeller is positioned to the bottom 53 only a very minor amount of slurry passes up along the wall 54, so that substantially all of the slurry passes along the bottom 55. The agitator 60, also, passes a substantial amount of slurry laterally along the bottom 53 and subsequently upwards along the bottom 55. Where an elongated drum is used two or more of the agitators may be mounted along the front wall of the tank to provide sufficient agitation and mixing of the slurry in the tank along the length of the drum.

The device illustrated in a plan view in Fig. 7 includes a drum 70 journaled for rotation in a tank 71 on a shaft 72, only partially shown. A pair of mixers 73 are mounted on the tank, and the mounting permits the mixers to be rotated so as to change the angle of the mixer shafts 74 in relation to the axis of the drum. By varying the angle of the shafts, complete mixing is assured, especially with large filters which require a relatively large volume of slurry.

With all of the tanks of the present invention, having the small shallow well and the remainder of the tank substantially following the outline of the periphery of the filter element, only a small amount of slurry is utilized in the tank. The position of the agitator thoroughly mixes and circulates the slurry throughout the tank so that the slurry is substantially homogeneous. From a practical standpoint, settling is one of the major problems of rotary filter design and the present invention using a small tank with mixers is valuable for overcoming any settling in such rotary filters or permitting maximum filtration rates. The relatively small amount of slurry in the tank prevents any great depth of settled solids in the event that the filter is shut down, so that the tank does not have to be drained of slurry in the event of such a shut down. Since the agitators are individually controlled, they may be turned on one at a time thereby dispersing rapidly any settled solids which may have settled from a shut down of the filter. The agitators are individually controlled, therefore, the entire mass of the slurry does not have to be stirred up as with the paddle or oscillating type agitators.

While the invention has been described by reference to specific illustrations, there is no intent to limit the invention to the precise details so illustrated, except insofar as set forth in the following claim.

We claim:

A rotary vacuum filter comprising a slurry tank having end walls and downwardly converging front and rear walls to form a closed bottom, a horizontal shaft rotatably mounted relative to said end walls, a plurality of filter disks mounted on said shaft and extending downwardly into said tank with the peripheries of said disks closely adjacent the downwardly converging front and rear walls, an impeller shaft positioned between adjacent disks and extending from a location adjacent the bottom of the tank to a position above the normal level of the slurry normally in said tank, means to rotatably support said impeller shaft from a support above the level of said slurry including bearing means, an impeller on said shaft, and means to drive said impeller shaft in a direction to force the slurry axially away from the lower end of said shaft to agitate the slurry, and means to rotate said filter disks in an upward direction adjacent said impeller shaft.

References Cited in the file of this patent

UNITED STATES PATENTS

| | | |
|---|---|---|
| 1,087,647 | Drage | Feb. 17, 1914 |
| 1,410,221 | Pettis | Mar. 21, 1922 |
| 2,044,214 | Jones | June 16, 1936 |
| 2,699,872 | Kelsey | Jan. 18, 1955 |

FOREIGN PATENTS

| | | |
|---|---|---|
| 612,919 | Germany | May 8, 1935 |